United States Patent [19]

Israel

[11] Patent Number: 5,599,586
[45] Date of Patent: Feb. 4, 1997

[54] CHEMICAL MAINTENANCE SYSTEMS FOR RESIDENTIAL ROOFING MATERIALS

[76] Inventor: Michael G. Israel, 14895 Feather Cove Rd., Clearwater, Fla. 34622

[21] Appl. No.: 424,717

[22] Filed: Apr. 18, 1995

[51] Int. Cl.$^6$ ...................................................... B05D 3/00
[52] U.S. Cl. .......................... 422/299; 427/340; 427/341; 427/393.6; 428/907; 524/428; 524/395
[58] Field of Search ................................ 427/393.6, 340, 427/299, 341; 428/907; 524/421, 395

[56] References Cited

U.S. PATENT DOCUMENTS

| | | | |
|---|---|---|---|
| 4,017,662 | 4/1977 | Gehman | 427/393.6 X |
| 4,168,255 | 9/1979 | Lewis et al. | 427/393.6 X |
| 4,571,415 | 2/1986 | Jordan | 524/428 |
| 5,415,919 | 5/1995 | George et al. | 422/393.6 X |

*Primary Examiner*—Michael Lusignan

[57] ABSTRACT

This invention discloses weatherable elastomeric and thermoplastic composite polymer films incorporating organometallic complexes for protection of exterior surfaces against the growth of dark colored algae. The process involves the surface reaction of water soluble polyvalent metallic salts with surfactants at reduced surface tension in the presence of film forming emulsion polymers. The lipophilic organometallic reaction products thus formed are encapsulated by polymer films with demonstrated exterior weathering durability in roof mastics and architectural coatings. By virtue of their vapor transmission, adhesion and elastic properties, the composite polymer films incorporating compatible algicidal organometallics extend both the life and appearance of exterior substrates.

14 Claims, No Drawings

5,599,586

1

CHEMICAL MAINTENANCE SYSTEMS FOR RESIDENTIAL ROOFING MATERIALS

BACKGROUND OF INVENTION

1. Field of invention

This invention relates to an improved chemical system for the enhancement and maintenance of cementaceous and composite asphalt building materials.

2. Description of the Prior Art

Cement tile and asphalt shingles have historically dominated the residential roofing market. Despite their success, the unattractive discoloration encountered throughout the United States and Canada particularly in moist temperate climates is becoming increasingly unacceptable. While the approach among respective manufacturers differ, the consensus in the cement tile industry has deferred the problem to the after market roof cleaning industry which has flourished in providing the routine service required to maintain appearance. High pressure water systems incorporating chlorine bleach are typically used. In warm humid climates typical in the Gulf States the service is required annually. Roof painting where permitted can postpone reoccurrence approximately two fold. In contrast, the asphalt shingle industry cautions against the use of high pressure washing systems as the process may remove granules which will shorten roof life. A gentle application of dilute aqueous chlorine bleach and trisodium phosphate from a ladder or walkboards is suggested by the Asphalt Roofing Manufacturers Association to avoid roof damage. The effectiveness of such cleaning is only temporary and there is little evidence of successful practitioners serving the residential asphalt shingle after-market. However, manufacturers offer several types of algae resistant products which have met with limited success.

The state-of-the-art technology for algae resistant asphalt shingles centers on a source of microbicide which can be released as a result of mechanical and/or chemical weathering. Of commercial significance, are shingles incorporating a percentage of zinc metal or zinc oxide coated granules as the inhibitor source. A second generation incorporating copper oxide as an inhibitor source of relatively higher toxicity has recently been introduced. The release of soluble metallic salts from these sources is typically via adsorption of carbon and sulfur dioxides in presence of moisture yielding acidic reactants. The residence time of soluble metal salts released from these products can be quite limited being readily removed by rain. However, slow release of inhibitor from these relatively inert sources is projected to continue over extended periods of time. Clearly, environmental conditions as they effect release and residence time on roof surface are major variables in this mechanism of inhibition. The effectiveness of the technology can only be improved with increased quantities of source material exhibiting higher levels of toxicity to counteract the transient nature of the active chemical inhibitors.

The present industry approach appears well founded on the observed inhibition which develops on the trailing surfaces below metal vents and stand pipes installed with roofing systems. While this potential source of tin, copper and zinc microbicide in the form of soluble metal salts is obvious, the mechanism by which inhibition is established may not be. A priori, released microbicide from any source must have a finite residence time in order to be effective. For this purpose, the exchange and chelation of polyvalent metallic ions with organic and inorganic receptor sites that develop on weathered asphalt and granule surfaces is well documented. Carboxylic acid end groups represent the highest oxidation state of asphalt surface while hydrous oxide surface functionality results from granule weathering. As electron donor sites, both interact with polyvalent metal cations to increase their residence time on weathered roof surfaces. Uncontrolled early release of such inhibitors contributes both to their fugitive nature and the substantial chemical inefficiencies inherent in the present state-of-the-art. Further compromises result from the complexities of asphalt shingle manufacture involving distribution and adhesion by partial embedment as the only means of securing granule inhibitor sources.

OBJECTS OF THE INVENTION

It is an object of the present invention to provide an improved chemical treatment system to inhibit algae discoloration which occurs on cement tile and composite asphalt roofing products.

It is a further object of the present invention to provide a durable transparent chemical system which confers luster with out altering esthetic appearance and retains a level of effectiveness consistent with the life of roof surface.

It is a still further object of the present invention to provide a predetermined controlled level of active chemicals securely bound and uniformly distributed over the entire exposed area of the roof assuring optimum effectiveness against discoloration.

It is another object of the present invention to provide a simple and economical process for the application of the improved chemical treatment system which can be used to enhance after market maintenance procedures and alternatively be incorporated in plant manufacture or field installation of cement tiles or asphalt shingles. These and other objects and advantages of the present invention will become more apparent to those skilled in the art when the instant disclosure is read in conjunction with the accompanying examples.

SUMMARY OF THE INVENTION

The above objects have been achieved in the process of the present invention by utilizing a weatherable water-borne resin in combination with wetting agents which confer positive spreading coefficients for effective uniform thin film coverage over the entire surface area of the roofing product. Incorporation of polyvalent metallic salts can be accomplished by concurrent premixing of compatible aqueous systems for combined application with resin or separate sequential treatment. On setting, the polyvalent metallic cations become bonded by organic ligands with the desired uniform distribution and intimate contact over the entire surface area susceptible to algae growth. The chemical treatment system inhibits algae discoloration of both asphalt shingles and cement tile and needs only to be applied to exposed surfaces given the true autotrophic nature of the predominant species encountered.

The transparent water-borne resins used in the system may suitably be any of the water-borne resins including those engineered for optimum adhesion and weatherability as single-ply membranes for built-up roofing application. Among the commercially more cost effective, vinyl polymers of acrylate esters and their copolymers with styrene, vinyl acetates and urethanes have gained prominence in built-up roofing applications by virtue of excellent weathering, adhesion and elastic properties. Emulsion systems formulated with thermoplastic, cationic exchange and chelating resins can also be used to secure the polyvalent metallic cations. Copolymer polyacrylate resin products of anionic polymerization are particularly suitable; alone or in combination with other organic ligands.

Employed in conjunction with the water-borne resin is sufficient wetting agent, based upon surface tension required, to achieve positive spreading on the substrate surface. A wide variety of ionic and nonionic wetting agents are available for this purpose. The preferred wetting agents are high performance alkyl and alkyl ester sulfonates, which provide excellent system compatibility. The preferred water-borne resins and wetting agents comprise anionic organic ligands which serve to secure the polyvalent metallic cations in the form of unique chelates and salts with general microbicide activity and excellent chemical stability. The preferred microbicides are comprised of water soluble salts of copper, tin and zinc which also confer the desired system compatibility and durability.

DETAILED DESCRIPTION OF THE INVENTION

The method of the present invention is suitable for treating exterior residential roofing products which support the growth of unsightly dark colored algae. Representative products include the popular composite asphalt shingles and cement tiles which typically contain carbonate nutrients for the prevalent gloeocapsa algae. It is beneficial to clean or otherwise restore the esthetic appeal of roof surfaces prior to application of the chemical inhibitor system. As a special feature of the present invention, surface active agents are incorporated to overcome the resistance to wetting and rewetting characteristic of roofing surfaces. The enhanced performance of bleaching and/or cleaning processes through the use of wetting agents is readily apparent in terms of the uniformity of chemical absorption achieved. The incorporation of optimum surface specific wetting agent clearly advances state-of-the-art and is instrumental to chemical effectiveness and efficiency of roof cleaning as well as application of inhibitor system with uniform distribution and ultimate adhesion.

The inhibitor system of the present invention is composed of polyvalent metallic salts and chelates with the organic ligands of wetting agents and water borne-resins. The system is produced on the roofing surface through interaction of inorganic water soluble polyvalent metallic salts and formulated organic water-borne resins and wetting agents. The soluble polyvalent inhibitor salts become encapsulated as the resin sets through interaction in binding dissociation equilibria. Displacement of monovalent resin and surfactant cations by polyvalent metallic inhibitor cations is solubility driven by the precipitation of insoluble polyvalent salts and chelates. The monovalent cation by-product salts are eventually leached from the inhibitor film system during subsequent weather exposure. Uniform deposition accomplished with the use of wetting agent permits the ultimate system stability and versatility. The durability of the inhibitor system derives from the inherent bonding nature of film forming resin and the compatibility of organometalic inhibitor salts and chelates formed upon co-application of the chemical system. Substrate surface as the point of microbial growth can be uniformly protected with effective composition and concentration of inhibitors. The physical and chemical stability to ultraviolet light/weathering as well as the level of toxicity for a range of ion pairs is well documented as basis for selection. Most significantly, the novel polyvalent metallic salts and chelates of organic ligands produced by exchange exhibit greater affinity toward the organisms responsible for discoloration owing to their lipophilic nature.

In addition to uniform application of the inhibitor system, stiochometry is important for optimum chemical efficiency. For this purpose, an excess of anionic organic ligand is incorporated to drive the binding dissociation equilibria toward insoluble polyvalent chelate and salt formation. Precautions must be taken in application to avoid premature coagulation of the water-borne resins by added electrolyte. Sequential or dilute surface addition of components is effective toward circumventing this instability problem. Surface areas of residential roofing products are typically quite low and can be satisfactorily protected with thin film inhibitor coverage toward achieving optimum adhesion and cost effectiveness. The versatility of the system allows for concentration and composition control of both the microbicide and binder ligands for optimum product performance. Most surprising and very unexpected is elimination of adverse surface blushing of polymer films accompanying ligand exchange yielding more hydrophobic structures. Quite significantly, blushing has been the primary impediment in development of transparent single-ply membrane technology of water-borne resins. This is particularly true in residential roofing where the luminous opacity accompanying the surface dew point temperature is esthetically unacceptable in the marketplace. The obviation of blushing in the present systems leaves only a degree of luster imparted by the transparent film without altering the original esthetic appeal.

As mentioned above, substrate surface wetting is instrumental toward achieving optimum chemical efficiencies of the present invention. As a general class of surfactants they can be nonionic, anionic or cationic. Representative types include alkyl- and alkyl arylethoxylates, sulfates, sulfonates and quaternary ammonium salts. Nonionic ethoxylates of synthetic aliphatic alcohols with low HLB are available under the trade name Renex from ICI Americas Inc., Wilmington, Del. Polyoxypropyl polyoxyethyl block copolymers available under the trade name Pluronic from BASF Corp., Parsippany, N.J. are also effective nonionics. Alkyl sulfate sodium salts available under the trade name Witcolate from Witco Chemical Corp., New York City, N.Y. are preferred in bleaching formulations for their stability. Alkyl sodium sulfo succinates, available from various suppliers, are preferred for most difficulty wettable substrates. Generally, wetting agents serve equally well in rewetting and therefor, can be applied independently in preparing the substrate surface or as a formulated component. Each formulations must be evaluated with regard to pot life to circumvent premature interactions which include the exchange of an equivalent amount of organic ligand as an integral part of the inhibitor system. Product selection is dictated by properties of the specific substrate and the necessary reduction of liquid surface tension to facilitate wetting which is readily apparent in droplet behavior upon surface contact.

The toxicity of metal salts over abroad range has been published in numerous technical sources such as "Dangerous Properties of Industrial Materials", 6th edition by N. Irving Sax. While any water soluble salts of polyvalent metals from the third, fourth and fifth horizontal periods of the periodic table can be used, judicious selection would focus on metals responsible for the inhibition observed on existing roof installations which include zinc copper and tin. Examples of salts which can be used in accordance with the present invention include, zinc acetate dihydrate, zinc sulfate heptahydrate, cupric sulfate pentahydrate, cupric nitrate trihydrate and stannic sulfate dihydrate. They are readily dissolved and commercially available. The deposition of these salts from solutions with positive spreading coefficients assures effective molecular coverage of the substrate surface which supports algae growth.

Any suitable exterior water-borne resins and organic ligands may be used in securing the polyvalent metallic inhibitors of the present invention via mechanisms of encapsulation, chelation and salt formation. The elastomeric roof mastics, which have been developed for adhesion, elongation and weatherability, exhibit optimum performance in transparent thin film application on sloped surfaces. As indicated above, anionic water-borne resin systems are preferred to secure polyvalent metallic cations in binding exchange equilibria and it is desirable to have films with good light stability and elasticity. Examples of polymer emulsions which can be used in accordance with the present invention are styrene-acrylic ester copolymers available from Rhone-Poulenc, Kennesaw, Ga. under the trade name Rhodoplas. The preferred acrylic ester copolymers which generally offer superior light stability are available from Rohm & Haas Co., Philadelphia, Pa. under the trade name Rhoplex. The particularly suitable resins are those which exhibit sufficient thermoplastic character to resists dirt pickup and sufficient light stability to resist yellowing during service life.

The relative amounts of polyvalent metal salt, organic ligands can vary widely within the primary objective to accommodate both the specific substrate surface and service requirements. Of the total composition yielding the microbicide system more than about 85% is organic and the remaining inorganic salt content is ultimately reduced to less than about 5% as a result of leaching the monovalent by-product salts during service life. A preferred composition is 91% organic ligands and 9% metallic salt. Valence state and equivalent weight of the selected metallic salts are determining factors in establishing stiochometry and a substantial excess of organic ligand can be highly beneficial. While surface films uniformly applied can physically encapsulate metallic inhibitors the transfer of polyvalent metallic ions to the solid phase by cation exchange is a preparative feature which relies on receptor sites incorporated in anionic resin systems. The organic ligands exchanged in chelate or salt formation confer film compatibility and added durability of the microbicides. The preferred products exhibit lipophilic properties with enhanced microbicide activity, while the resin film serves to reduce surface erosion and prolong roof life.

The inhibitor system is readily produced by applying the dissolved polyvalent metal salt and resin emulsion in ratios ranging from 1:10 to 1:500 parts by weight respectively. Incorporation of wetting agent at levels comparable to metal salt are typical. The process is carried out by any suitable method such as spraying, rolling or brushing of components preferably on a clean, readily wettable surface. A preferred method is by simultaneous dual spray application of salt solution and resin emulsion. The quantities applied in coverage of exposed roofing surface is in the range of 0.01 to 3.0 pounds per square. The preferred level of application is in the range of 0.1 to 0.3 pounds per square. Versatility of the system in terms of both chemical composition and level of application permit adaptation to specific substrates as well as environmental exposure conditions.

The invention is further illustrated by the following examples in which all parts and percentages are by weight unless otherwise indicated.

EXAMPLE 1

Samples of asphalt shingle and cement tile were treated with various water-borne resins and exposed to atmospheric conditions in Central Florida. Samples consisted of light and dark shingle composites and unpigmented cement tiles. Resin emulsions were brush applied to the rough surfaces producing films approximately 3 to 5 mils thick. The samples were monitored with the following observations; plus signs indicating relative degree.

| Substrate | Resin | Daily | 3 months | 6 months | 12 months |
|---|---|---|---|---|---|
| Light shingle | 1 | blush++ | soil+ | soil+ | soil+yellow++ |
| | 2 | blush++ | unchanged | soil+ | soil+ |
| | 3 | blush++ | unchanged | unchanged | unchanged |
| Dark shingle | 1 | blush+++ | soil+ | unchanged | soil+ |
| | 2 | blush+++ | unchanged | unchanged | soil+ |
| | 3 | blush+++ | unchanged | unchanged | unchanged |
| Cement tile | 1 | blush+ | unchanged | unchanged | soil+yellow+ |
| | 2 | blush+ | unchanged | unchanged | soil+ |
| | 3 | blush+ | unchanged | unchanged | unchanged |

Resin 1. Rhodoplas GS 125; styrene acrylate copolymer.
Resin 2. Rhoplex EC 1791; acrylate copolymer.
Resin 3. Rhoplex AC 264; acrylate copolymer.

Given necessary atmospheric conditions, daily blushing was observed from sunrise until surfaces dried. The blushing effect was most objectionable on dark asphalt shingle and least noticeable on unpigmented cement tile. Soiling and yellowing were slight in each case but most apparent on the light gray asphalt shingle.

EXAMPLE 2

A residential site was selected for initial evaluation of wetting requirements on discolored product. The color of the original off-white asphalt shingle roofs North face was indiscernible alter six years service life. The soiled surface with approximately 3 in 12 pitch was sectioned for the following chemical evaluations. Wetting as a function of color removal by scrubbing and bleaching was examined for a series of surfactants in addition to uniformity in application of metal salt solution and resin emulsion. Surfactant selections were based upon preliminary examination of chemical compatibility and integrity of polymer films prepared on glass plates.

| SURFACTANT, 3% | MILD SCRUB | 3% SODIUM HYPOCHLORITE | ZINC ACETATE DIHYDRATE, 0.2% | 7 STYRENATED ACRYLIC, 10% |
| --- | --- | --- | --- | --- |
| 1<br>Disodium dihexadecyl diphenyl oxide disulfonate | poor | fair | fair | good |
| 2<br>Sodium salt polymeric carboxylic acid | poor | fair | fair | good |
| 3<br>Alkyl benzene sulfonate/alkanol amide/ethoxylate | fair | fair | fair | good |
| 4<br>Polyoxyethylene (12) tridecyl alcohol | poor | fair | fair | good |
| 5<br>Ethyl hexyl sulfate sodium salt | poor | good | good | good |
| 6<br>Sodium ethoxylated alcohol sulfo succinate | poor | excellent | good | good |

1. Dowfax (R) 8390, Dow Chemical Co. 2. Tamol 850, Rhom&Haas Co. 3. Witcodet 100, Witco Chemical Corp. 4. Renex 30, ICI Inc. 5. Witcolate D-510 & 6. Emcol 4300, Witco Chemical Co. 7. Rhodoplas GS 125, Rhone-Poulenc.

The roof surface, vertically sectioned in sixths, was treated with individual surfactants and mildly scrubbed to assess color removal as a first step. Sodium hypochlorite was then spray applied slowly, avoiding run off as much as possible, until the original shingle appearance was restored. Efficiency of the chemical bleaching via surface wetting was the major observable effect in this sequence. Zinc acetate solution was applied over the entire surface followed by resin emulsion over the lower half; both at approximately 1 gal. per 500 sq. ft. Two years have lapsed since the roof was treated with no evidence of reoccurring discoloration.

EXAMPLE 3

A Planned Unit Development of one hundred villas developed severe irregular discoloration on North facing roof exposures during a seven year life. A maintenance service was contracted to restore the original beige asphalt shingle roof appearance which involved initial cleaning/bleaching/rinsing followed by a subsequent annual maintenance treatment to remove reoccurring discoloration. A single 1500 sq. ft. roof with 4 in 12 pitch was isolated from the service at the mid point between cleaning cycles for comparative inhibitor evaluation. The test roof was treated in turn with sodium ethoxylated alcohol sulfo succinate (0.3%), zinc acetate (0.3%) and Rhoplex E-2540 acrylic emulsion (7.0%) at rates of approximately 1 gal. per 500 sq. ft. The test roof has shown no evidence of reoccurring discoloration during the 2 and ½ years since the inhibitor treatment was applied. The remaining roofs continue to be cleaned annually to remove the objectionable reoccurring discoloration, i.e. 2 additional cleaning cycles completed.

EXAMPLE 4

A 7 year old 4000 sq. ft. single family home with beige asphalt shingles was selected as a worst case of discoloration on a recessed shaded portion of the North facing roof with 6 in 12 pitch. The depth of microbial growth and the slope rendered the roof accessible only from the adjoining elevated sections on either side which exhibited irregular relatively moderate discoloration. The elevated surfaces were cleaned with 3% sodium hypochlorite solution containing 0.5% sodium 2-ethyl hexyl sulfate spray applied at a rate controlled to circumvent any run off. Using 5% sodium hypochlorite solution containing 0.05% dioctyl sulfo succinate sodium salt, the recessed portion was also cleaned without chemical loss. Chemical efficiency approaching that of solution reaction was achieved through controlled surface wetting; eliminating first black and then purple coloration in restoring the original shingle color without run-off.

Only the recessed portion of the roof was treated to permit comparative evaluation of zinc inhibitor system. The 0.2% solution of zinc sulfate heptahydrate was spray applied without additional wetting agent followed by a 5.0% active emulsion of Rhoplex EC 1685; each at approximately 1 gal. per 500 sq. ft. Neither the cleaned elevated or cleaned and treated recessed roof sections show any evidence of reoccurring discoloration approaching 2 years exposure.

EXAMPLE 5

Major manufacturer's composite asphalt shingles and cement tile samples were treated to evaluate alternative inhibitor systems. For this purpose, individual production samples of asphalt shingles, slurry coated and uncoated cement tiles were spray coated with 0.5% sodium ethoxylated alcohol sulfo succinate solution followed in turn with 0.25% copper sulfate or 0.25% stannous chloride and 3.5% active Rhoplex AC 264 acrylic copolymer emulsion. The treated samples, acceptable on visual examination and devoid of blushing on exposure, are well into the second year of exposure with no evidence of discoloration. Notably, accelerated exposures tests are also going forward at several sun-belt locations.

I claim:

1. A process of forming a thin unpigmented film on the exterior surface of a substrate for protection against the growth of dark colored algae comprising applying to the surface an aqueous mixture comprising effective film-forming amounts of (a) a water soluble polyvalent metallic salt, (b) an organic anionic, nonionic or cationic surface active agent, (c) an elastomeric and/or thermoplastic weatherable, weather-resistant film forming emulsion polymer, and (d) water, wherein the metallic salt, surface active agent and emulsion polymer are applied concurrently or sequentially in a range of from 0.01 lb. to 3.0 lb. per 100 square feet without prior interaction and coagulation of the metallic salt and emulsion polymer.

2. The process of claim 1 wherein the aqueous mixture/ comprises (a) alkyl-sulfonate, -sulfosuccinate and/or -carboxylate wetting agents, (b) a polyvalent metal salt, (c) an elastomeric and/or thermoplastic anionic polyacrylate emulsion polymer, and (d) water, wherein the wetting agents and polyvalent metal salt are applied sequentially or concurrently followed by the polymer.

3. The process of claim 1 wherein said polyvalent metallic salt comprises a metal whose atomic weight is in the range of 45 to 125.

4. The process of claim 3 wherein the surface active agent comprises a member selected from the group consisting of alkyl- and alkyl aryl- ethoxylates, sulfates, sulfonates, carboxylates and polyoxypropyl polyoxyethyl block copolymers capable of reducing aqueous surface tension below 45 dynes per centimeter, and mixtures thereof, and the film forming emulsion polymer comprises a member selected from the group consisting of homopolymer and copolymer emulsions of vinyl acetate, styrene and acrylates produced via anionic polymerization, and mixtures thereof.

5. The process of claim 1 wherein the surface active wetting agent and elastomeric and/or thermoplastic weatherable film forming polymer comprises from 75% to 98% of the active chemicals applied to the substrate surface and water soluble polyvalent metallic salt comprises from 2% to 25%, and the surface active wetting agent and water soluble metallic salt are in a ratio ranging from 1:1 to 1:100.

6. The process of claim 1 wherein the elastomeric and/or thermoplastic weatherable film forming polymers contain chelating and cation exchange ligands, including but not limited to polyfunctional sulfates, sulfonates and carboxylates.

7. The process of claim 1 wherein the substrate surface appearance is first restored by cleaning or bleaching with application of organic surface active wetting agent, followed by concurrent or sequential application of polyvalent metallic salt solution and emulsified weatherable film forming emulsion polymer.

8. The process of claim 3 wherein the surface active wetting agent and elastomeric and/or thermoplastic weatherable film forming polymer comprises from 85% to 95% of the active chemicals applied to the substrate surface and water soluble polyvalent metallic salt comprises from 5% to 15% and the surface active wetting agent and water soluble metallic salt are in a ratio ranging from 1:1 to 1:20 and the active chemicals applied are in a range of from 0.1 lb. to 0.3 lb./100 sq. ft.

9. The process of claim 8 wherein the water soluble polyvalent metallic salt comprises a member selected from the group consisting of stannous chloride dihydrate, zinc acetate dihydrate, cupric sulfate pentahydrate and mixtures thereof.

10. The process of claim 9 wherein the surface active wetting agent is a member selected from the group consisting of 2-ethyl hexyl sulfate, a sulfo succinate, and mixtures thereof.

11. The process of claim 10 wherein the elastomeric and/or thermoplastic weatherable film forming emulsion polymer is an acrylic copolymer engineered for exterior durability.

12. The process of claim 3 wherein the elastomeric and/or thermoplastic weatherable film forming polymer contains anionic salt forming, chelating and cation exchange ligands which include but are not limited to sulfates, sulfonates and carboxylates.

13. The process of claim 3 wherein substrate surface appearance is first restored by cleaning or bleaching with application of surface active wetting agent followed by concurrent or sequential addition of polyvalent metallic salt solution and weatherable film forming polymer.

14. The process of claim 3 wherein surface active wetting agent with concurrent or sequential addition of polyvalent metallic salt solution and weatherable elastomeric and/or thermoplastic film forming emulsion polymer are applied to new asphalt shingles and cement tiles as an integral part of plant manufacture or field installation.

* * * * *